United States Patent [19]
Giannelli

[11] Patent Number: 4,953,508
[45] Date of Patent: Sep. 4, 1990

[54] BOILER FOR STEAM FLATIRONS, INCORPORATING AN IMPROVED REPLENISHMENT MANIFOLD

[75] Inventor: Giuseppe Giannelli, Olgiate Comasco, Italy

[73] Assignee: Micromax S.p.A., Como, Italy

[21] Appl. No.: 315,099

[22] Filed: Feb. 24, 1989

[30] Foreign Application Priority Data

Feb. 24, 1988 [IT] Italy .................. 19514 A/88

[51] Int. Cl.$^5$ .................. F22D 33/00; F22D 5/26
[52] U.S. Cl. .................. 122/7 R; 122/7 A; 122/451 R; 122/451.1
[58] Field of Search .................. 122/1 R, 7 A, 451 R, 122/451.1

[56] References Cited

U.S. PATENT DOCUMENTS

| | | | |
|---|---|---|---|
| 1,979,299 | 11/1934 | Veenschoten | 122/451.1 |
| 1,980,455 | 11/1934 | Veenschoten | 122/451.1 |
| 2,629,551 | 2/1953 | Audino | 122/451.1 |
| 4,258,668 | 3/1981 | Bekedam | 122/1 R |
| 4,502,419 | 3/1985 | Smith, Jr. | 122/32 |

Primary Examiner—Henry C. Yuen
Attorney, Agent, or Firm—Sughrue, Mion, Zinn, Macpeak & Seas

[57] ABSTRACT

The boiler includes a tight receptacle having a replenishment manifold which opens into the receptacle at an intermediate level thereof so as to define a first replenishment level. The boiler also includes a normally closed valve controllable to open for venting off the receptacle and thereby defining a second replenishment level thereof which is higher than the first level.

6 Claims, 3 Drawing Sheets

BOILER FOR STEAM FLATIRONS, INCORPORATING AN IMPROVED REPLENISHMENT MANIFOLD

BACKGROUND OF THE INVENTION

This invention relates to a boiler for steam flatirons, of a type which comprises a tight receptacle having a replenishment manifold.

A trend of ironing appliances comprising a separate flatiron from a boiler has been toward an increase of the boiler capacity so as to expand their autonomy of operation.

When the boiler capacity is increased, however, it is to be expected that, for a given available power, the times required for steam rising and the appliance to attain steady state operation are bound to increase proportionally.

This entails conflicting requirements. For instance, there are some who favor quick attainment of steady state by the flatiron and boiler, to the detriment of autonomy of operation, and others who place prolonged autonomy of operation before a short time of attainment of the thermal state required for proper ironing.

With prior boilers which are equipped with a filler inlet cut through the ceiling of the tight receptacle, such conflicting demands are reconciled by adopting a procedure of metered boiler replenishment whereby a small amount of water is introduced into the boiler when a fast heating rate of the water is aimed at, and a large amount of water whenever it is autonomy of ironing that gains priority.

However, at the end of the ironing operation, the residual water is not customarily taken out of the boiler, and on the next ironing occasion, the boiler has to be topped up.

Since it is no easy task to assess the exact amount of water left over in the boiler, the topping up process is of necessity a pretty inaccurate one, thereby it may happen that the amount of water introduced is either too small—which is apt to involve renewed topping up within a short time and attendant time allowance for the boiler to cool down—or too large—which enforces an extension of the time required to raise the pressure within the boiler to the operating range.

This constitutes a first drawback of prior boilers.

A further drawback, connected with manufacture aspects of the ironing appliance, is that a large number of components are to be mounted separately to the boiler; these components include safety valves, steam delivery lines, filler caps, etc.

In an effort to alleviate the manufacturing process, some of these components have been clustered; for instance, it is widespread practice to mount the boiler safety valve in a seat specially formed in the filler cap. This installation, however, provides no optimum solution to the problem of the operator's own safety.

SUMMARY OF THE INVENTION

The problem that underlies this invention is to provide a boiler for steam flatirons which is so structured as to overcome all of the drawbacks lamented in connection with the cited prior art.

This problem is solved according to the invention by a boiler as indicated being characterized in that said replenishment manifold opens into said receptacle at an intermediate level thereof so as to define a first replenishment level, and that it comprises a normally closed valve means controllable to open for venting the receptacle, thereby a second replenishment level is defined which is higher than the first level.

BRIEF DESCRIPTION OF THE DRAWINGS

The features and advantages of this invention will be more clearly apparent from the following detailed description of a preferred embodiment thereof, to be taken by way of illustration and not of limitation in conjuction with the accompaying drawings, where.

DETAILED DESCRIPTION OF THE INVENTION

Figure 1:
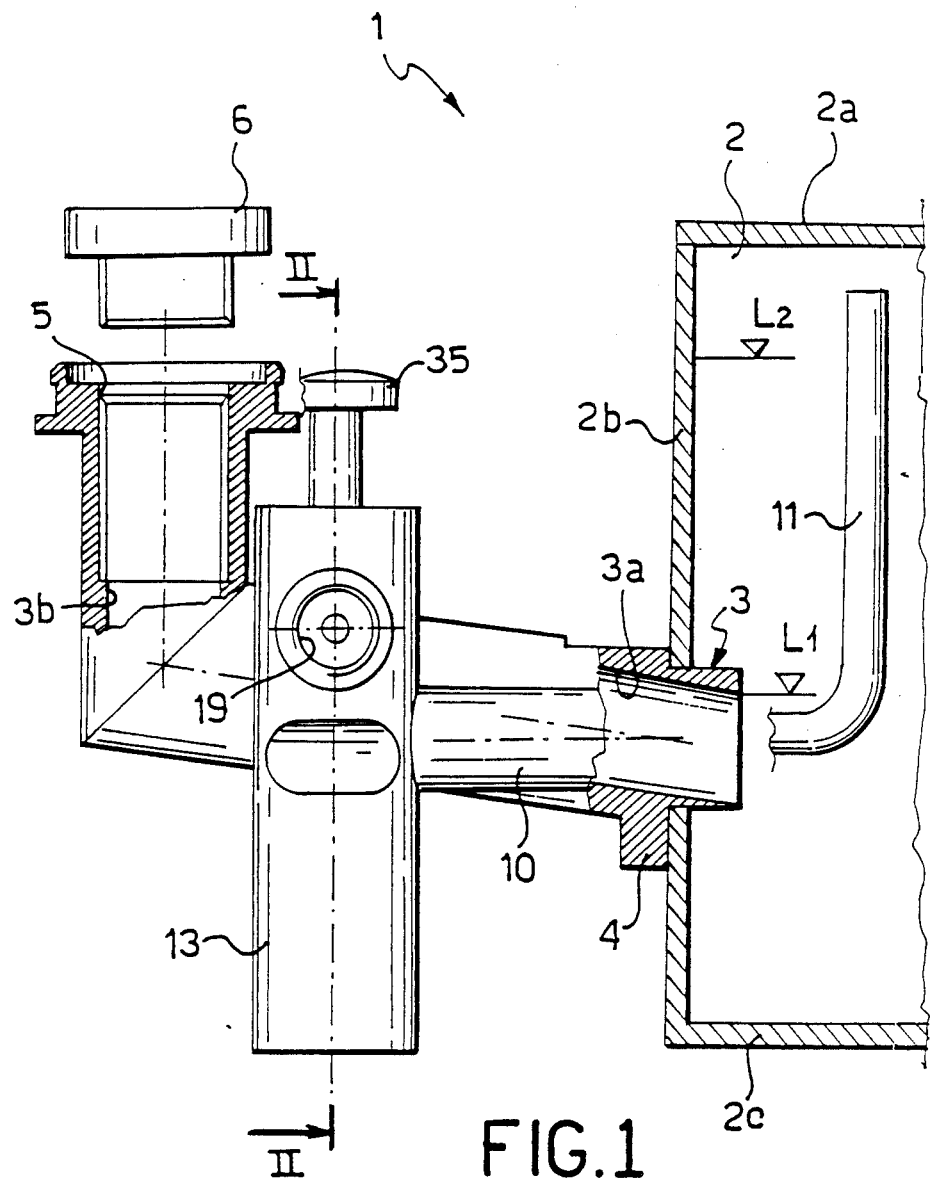
FIG. 1 is a part-sectional, side elevation view of a boiler constructed in accordance with this invention.
Figure 2:
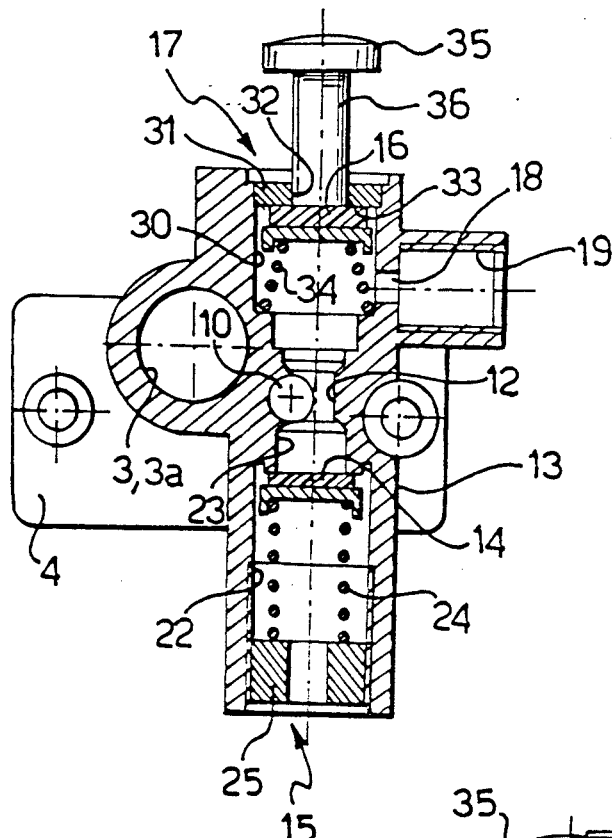
FIG. 2 is a sectional view taken along the line II—II in FIG. 1.
Figure 3:
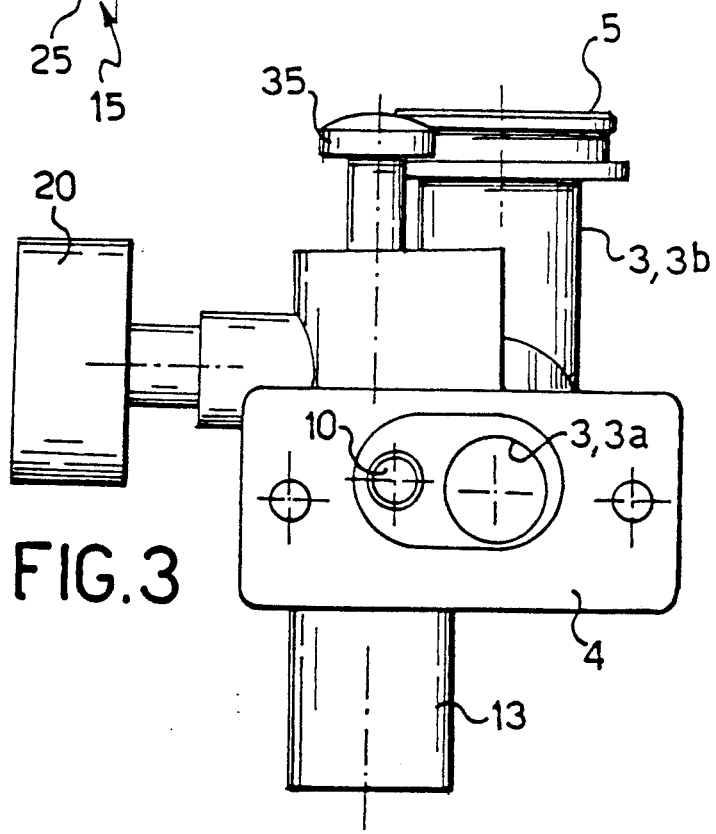
FIG. 3 is a front detail view of the boiler shown in the preceding Figures.

In FIGS. 1 to 3, the reference numeral 1 denotes comprehensively a boiler for a steam flatiron, not shown. The boiler 1 comprises a tight receptacle 2 having a top wall or ceiling 2a, side walls 2b, and a base wall or bottom 2c.

Through a side wall 2b there is formed, at an intermediate location between the bottom 2c and the ceiling 2a, a port to which a replenishment manifold, generally indicated at 3, is arranged to open.

The manifold 3 has two tubular sections 3a, 3b set at an angle; on the end portions of the sections 3a,b there is respectively formed a flange 4 for mounting the manifold 3 to the wall 2b and inside threaded filler 5 closed releasably by a cap 6.

The section 3a of the manifold 3 is flanked by a second delivery manifold 10 for the steam generated in the boiler 1.

The manifold 10 is an integral pressing with the manifold 3 and extends into the receptacle 2 with an elbow 11 open in the proximity of the ceiling 2a of said receptacle.

At the opposed end, the manifold 10 opens into a vertical axis chamber 12 formed inside a basically cylindrical body 13 which is an integral pressing with the manifold 3.

The chamber 12 is closed at its bottom axial end by a shutter 14 of a safety valve generally designated 15, and at its top axial end by a shutter 16 of a second valve, generally indicated at 17.

Said chamber 12 is also communicated, via a port 18, with a threaded fitting 19 adapted to accomodate a solenoid valve 20 as conventionally provided to control steam delivery.

The safety valve 15 is mounted with an axial bottom cavity 22 of the body 13. Said cavity 22 is cylindrical in shape and threaded internally.

The valve 15 includes, additionally to the shutter 14 and an abutment seat 23 therefor, a spring 24 effective to hold the shutter 14 against said seat 23, and a ring nut 25 threaded into the cavity 22 to adjust the spring 24 compressive force.

The second valve 17 fits into an axial top cavity 30 of the body 13. The cavity 30 is also threaded internally.

Said valve 17 comprises a ring nut 31 threaded into the cavity 30 and formed with a large center opening 32. Defined on the surface of the ring nut 31 facing into the chamber 12 is an abutment 33 for the shutter 16 which is biased to a normally closed position against said seat by a spring 34.

A pushbutton 35 having a cylindrical stem 36 extended through the center opening 32 is provided for moving the valve 17 to the open position by removal of the shutter 5 from its seat 33.

The boiler 1 operates as follows.

The necessary water for generating steam is introduced into the tight receptacle 2 through the replenishment manifold 3. Since the receptacle is a tight construction, air inside it is vented out through the manifold 3 as water is poured in.

This continues until a water level is reached inside the receptacle 2 which is substantially the same as the free end of the section 3a of the manifold 3 opening into the receptacle 2 (level L1).

This first intermediate filling level of the receptacle 2 is adequate to ensure medium autonomy of ironing.

In order to extend the autonomy of operation of the boiler 1, the latter should be filled up to a second level, designated L2 in the drawings, which is higher than the first level L1. This requires that the air pocket between the level L1 and the ceiling 2a of the receptacle 2 be vented out.

The latter operation is made feasible by the provision of the second valve 17. In fact, by holding the pushbutton depressed such that the shutter 16 is raised off the seat 33 against the spring bias force, the air can be vented out of the receptacle 2 through the steam delivery conduit.

It should be noted that with the filler inlet 5 placed at a lower level than the free end of the elbow 11, the level L2 is bound to be lower than the outlet of the elbow 11, thereby water is prevented from entering the steam delivery manifold.

Figure 4:
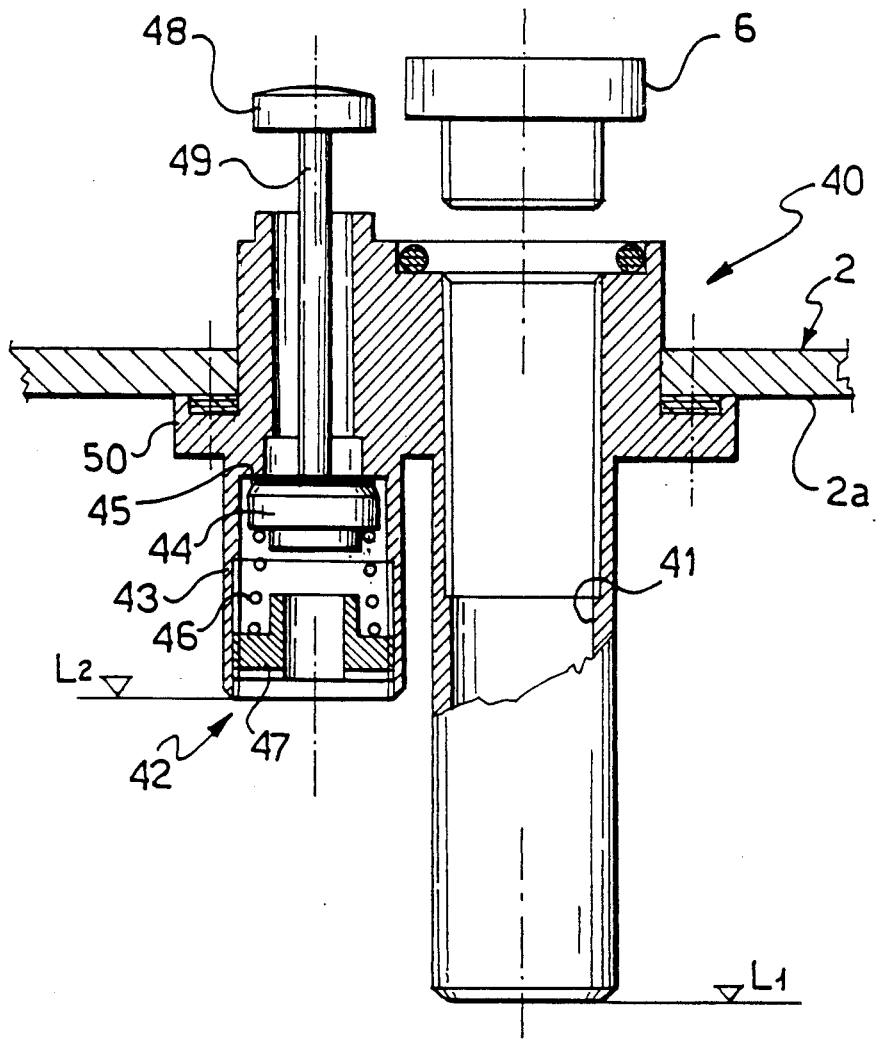
FIG. 4 is a longitudinal section detail view of a modified embodiment of a boiler according to the invention.

In the second embodiment of this invention shown in FIG. 4, where similar parts are denoted by the same reference characters as used in the preceding Figures, a replenishment manifold, generally indicated at 40, is mounted on the receptacle 2 at an opening formed through the receptacle ceiling 2a.

The manifold 40 comprises a single straight tubular section 41 having one end extended into the receptacle 2 up to an intermediate level L1, while the other end, which is threaded internally, forms a filling inlet for the boiler and is closed by a cap 6.

Accordingly, the receptacle 2 can be filled normally up to the level L1 in much the same way as described in connection with the manifold 3.

A valve 42 is provided to vent out the receptacle 2 such that it can be filled up to the level L2.

The valve 42 comprises, within a tubular housing 43, a cap-type shutter 44 normally closing against a seat 45 by virtue of a pressure exerted thereon by a spring 46. A ring nut 47, threaded into the housing 43, is arranged to adjust the amount of the shutter 44 loading by the spring 46.

A pushbutton 48, having a cylindrical stem 49, is connected to the shutter 44 such that, on depressing the pushbutton 48, the valve 42 can be driven to open, raising the shutter 44 off the seat 45.

Around the manifold 48/valve 42 assembly, there is formed a flange 50 for mounting said assembly to the ceiling 2a of the receptacle 2.

A major advantage of this invention is that the boiler filling or topping up operation is somewhat simplified over conventional boilers. In particular, where normal autonomy of operation is required of the boiler (replenishment up to level L1), one can be assured of the proper water level even without actually measuring the amount of water to be introduced.

Just as simple is replenishing the boiler for prolonged autonomy of operation, which only involves depressing a pushbutton.

Further, the downward location of the safety valve is safer for the user.

In addition, the boiler assembly procedure is simplified because the manifold and its accessory items can be preassembled separately and then connected to the receptacle via the flange connection upon installation of the boiler.

I claim:

1. A boiler for steam flatirons comprising:
   a closed receptacle having side walls, a top wall and a base wall;
   a replenishment manifold disposed in communication with said receptacle and having two tubular sections, a first tubular section having an outlet end in said receptacle at an intermediate location between said base wall and said top wall and a second tubular section connected to said first tubular section and having an inlet end at a level between said intermediate location and said top wall;
   a steam delivery manifold comprising a tubular section extending into said receptacle and having a free end located at a level between said top wall and a level coplanar with said inlet end of said second tubular section of said replenishment manifold; and
   a normally closed manually operated valve means for venting said receptacle whereby upon supplying water to said receptacle through said replenishment manifold with said valve means closed, the water will rise only to said intermediate location and upon supplying water to said receptacle through said replenishment manifold with said valve means open, the water will rise to said level of said inlet end of said second tubular section of said replenishment manifold.

2. A boiler as set forth in claim 1, wherein said valve means is disposed in said steam delivery manifold exteriorly of said receptacle.

3. A boiler as set forth in claim 1, wherein said replenishment manifold and said steam delivery manifold are formed as a single unit and extend into said receptacle through a common aperture in a side wall of said receptacle.

4. A boiler as set forth in claim 1, wherein said steam delivery manifold includes a chamber having first and second ports open to an ambient atmosphere exteriorly of said receptacle, said valve means having a valve member closing said first port and a safety valve disposed in said second port adapted to open upon exceeding a predetermined steam pressure in said receptacle.

5. A boiler as set forth in claim 4, wherein said valve member of said valve means is connected to a push button for manual control of said valve means.

6. A boiler as set forth in claim 1, wherein said first and second tubular sections of said replenishment manifold are connected at an angle to each other with said second tubular section being substantially vertically disposed and said first tubular section angling downwardly into said receptacle at an angle relative to a horizontal line.

* * * * *